(12) United States Patent
Kim

(10) Patent No.: US 9,008,495 B2
(45) Date of Patent: Apr. 14, 2015

(54) FLUID HEATER AND METHOD OF USE THEREOF

(76) Inventor: Joo Hyun Kim, Duluth, GA (US)

(*) Notice: Subject to any disclaimer, the term of this patent is extended or adjusted under 35 U.S.C. 154(b) by 448 days.

(21) Appl. No.: 13/409,438

(22) Filed: Mar. 1, 2012

(65) Prior Publication Data
US 2013/0230303 A1    Sep. 5, 2013

(51) Int. Cl.
| | | |
|---|---|---|
| *F24H 1/18* | (2006.01) | |
| *F24H 1/14* | (2006.01) | |
| *F24H 1/20* | (2006.01) | |
| *F24H 1/22* | (2006.01) | |
| *F22B 5/00* | (2006.01) | |

(52) U.S. Cl.
CPC .. *F24H 1/14* (2013.01); *F24H 1/20* (2013.01); *F24H 1/22* (2013.01)

(58) Field of Classification Search
CPC ............... F24H 1/14; F24H 1/20; F24H 1/22; H05B 2203/022; H05B 2203/021; H05B 3/0052
See application file for complete search history.

(56) References Cited

U.S. PATENT DOCUMENTS

| | | |
|---|---|---|
| 3,802,398 A | 4/1974 | Cancilla et al. |
| 4,385,908 A | 5/1983 | Carmichael |
| 5,103,859 A | 4/1992 | Martin et al. |
| 5,898,818 A | 4/1999 | Chen |
| 6,073,591 A | 6/2000 | Theriault |
| 2011/0265354 A1 | 11/2011 | Valiyambath Krishnan et al. |
| 2013/0068973 A1* | 3/2013 | van Ruth ........................ 251/11 |

* cited by examiner

*Primary Examiner* — Shawntina Fuqua
(74) *Attorney, Agent, or Firm* — Mathew L. Grell; Balser & Grell IP Law, LLC

(57) ABSTRACT

An apparatus for heating water and steam, that has a first container with cold water and a second container with hot water, the two containers being in fluid communication via an intermediary pipe having a one-way valve to permit flow only from the first container to the second container. The first container has a water level monitor that controls when an input pipe allows water to refill the first container. The second container has a heat exchanger, a steam input pipe, a steam output pipe, and a heating element. The second container may be connected to a steam press, a boiler, and a washing machine.

16 Claims, 4 Drawing Sheets

FLUID HEATER AND METHOD OF USE THEREOF

CROSS-REFERENCE TO RELATED APPLICATIONS

None

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE INVENTION

1. Technical Field of the Invention

The present invention relates generally to a fluid heater, and more specifically to a fluid heater with two distinct tanks, one housing cold water and one housing hot water, with a float measuring the water level of the cold water tank.

2. Description of Related Art

For as long as indoor plumbing has existed people have struggled with efficiently heating water for later utilization. Until now, no one has been able to produce a device that, while heating and storing water, is designed to mitigate "wear and tear" on the float element that senses water levels.

One previous approach was to utilize a single tank divided into sections, with the water and steam constantly flowing between the two sections. A problem with this approach is that the heated water was not effectively insulated from the rest of the device. Another problem is that the number of components required for this device to function increased the need for frequent repairs.

Another approach was to utilize a single tank, with the cold water kept within an insulated bag. Again, a problem with this approach is that, by virtue of the insulated bag expanding or contracting, it was very difficult to effectively insulate the cold water container from the heat of the hot water. Another problem was that the pressure difference between the hot water and the cold water in the insulated bag interfered with maintaining a desired flow rate of both.

Yet another approach was to utilize two separate tanks, with a sensor in the second tank to detect when water in the first tank should be sent into the second tank. A problem with this approach is that the corrosive effects of hot water make it difficult to maintain anything beyond the simplest machinery in the hot water tank.

Therefore, it is readily apparent that there is a need for a fluid heater that efficiently maintains a supply of hot water while minimizing the corrosive effects of hot water on water level sensing mechanisms.

BRIEF SUMMARY OF THE INVENTION

Briefly described, in a preferred embodiment, the present invention overcomes the above-mentioned disadvantages and meets the recognized need for such a device by providing an apparatus for heating water and steam, the apparatus having two containers, one with cold water and one with hot water, the water flowing from the first container to the second container. The first container has a water level monitor comprising a float that controls when an input pipe allows water to refill the first container. A heating element in the second container heats the water therein, and produces steam and hot water.

According to its major aspects and broadly stated, the present invention in its preferred form is a fluid heater having a first container and a second container, the first container having a water level monitor and input pipe, and the second container having a heating element. The two containers are in fluid communication via an intermediary pipe, the intermediary pipe having a one-way valve. The water level monitor has a float, arm and hinge, and is in electrical communication with the valve in the input pipe via a wire. The intermediary pipe only allows water to flow from the first container to the second container. The second container also has a steam input pipe and a steam output pipe, and the second container is in fluid communication with a boiler via the steam input pipe.

In use, water is moved from the first container to the second container via the intermediary pipe. The water surface in the first container is monitored via the water level monitor, and the water in the second container is heated by the heating element.

More specifically, the present invention is a fluid heater, the fluid heater having a first container, a second container, and a stand. The first container has side(s), a bottom, an input pipe, an intermediary pipe, a lower refill level, a maximum refill level, and a water level monitor, wherein the water level monitor has a float, a wire, an arm, and a hinge, and the input pipe has a one-way valve.

The second container comprises a top, a peripheral wall, a base, a steam input pipe, a steam output pipe, an output pipe, and a heating element. Steam flows into the second container from the steam input pipe, and steam flows out of the second container via the steam output pipe.

The first and second containers are disposed on a stand, and the stand is disposed on the floor. The water level monitor is secured to the inside of first container. The valve is disposed within the input pipe, and the valve selectively allows water into the first container via the input pipe. The water level monitor controls the valve by sending an electrical signal through the wire. The arm is hingedly secured to the water level monitor via the hinge, and the float is fixedly secured to the arm.

The first container is in fluid communication with the second container via the intermediary pipe. The intermediary pipe comprises a one-way valve that only permits water to flow from the first container into the second container.

The steam input pipe and steam output pipe are disposed through the top of the second container. The heating element is preferably disposed near the base. Steam and hot water are disposed within the second container, wherein the hot water surface comprises the border between the steam and hot water. The steam input pipe and the steam output pipe are fluidly connected to steam in the second container, but do not contact the hot water in the second container.

In a typical use, the second container is selectively in fluid communication with a steam press via the steam input pipe. A boiler is selectively in fluid communication with the steam press via the feed pipe, and the boiler is also in fluid communication with the second container via the steam output pipe.

The float is disposed at the water surface in the first container. As water is added to the first container via the input pipe, the water surface, and thus the float, will move away from the floor. As water exits the first container into the second container, the water surface, and thus the float, will move towards the floor. The hinge permits the arm, and thus the float, to freely move both closer to and farther from the floor.

When the water surface is level with the lower refill level, then the water level monitor opens the valve in the input pipe to replenish the water in the first container. When the valve is open then water flows into the first container, thereby causing the float to move farther from the floor and towards the maximum refill point. When the float is level with maximum refill point, then the water level monitor closes the valve. It will be recognized by those skilled in the art that the water level monitor may comprise any mechanism for measuring the disposition of water surface relative to the lower and maximum refill levels.

After the water exits the first container and enters the second container, the heating element heats what was formerly water into hot water. The hot water exits the second container via the output pipe.

In use, steam exits the second container via steam output pipe, and hot water exits via the output pipe, both steam and hot water moving to the boiler. After the boiler heats the hot water and steam, thus producing steam and some resultant condensate, the boiler sends steam to the dry cleaning machine via the feed pipe and the condensate gets sent back to the second container via the condensation pipe. The first container replenishes the water the in second container via the intermediary pipe, which only allows water to flow from the first to the second container.

It will be recognized by those skilled in the art that the steam press may comprise any machine that utilizes steam.

In an alternate embodiment, the fluid heater further comprises a washing machine, and the second container further comprises a heat exchanger, wherein the heat exchanger comprises a first end, a second end, and a coil. The coil is located within the hot water in the second container. A liquid, preferably water, is moved through the heat exchanger via the first end, coil, and finally the second end.

Although the heat exchanger is disposed within the second container, the liquid disposed within the heat exchanger is not in fluid communication with the hot water in the second container.

The liquid, disposed within the heat exchanger, flows from the first end of the heat exchanger to the second end via the coil. The large amount of surface area between the coil and the hot water within which the coil is disposed, permits heat to be transferred from the hot water to the liquid in the heat exchanger. Thus, the liquid near the second end is warmer than the liquid near the first end.

It will further be recognized that the liquid, which is within the heat exchanger, may be any liquid, including, without limitation, water. It will also be recognized that the washing machine may comprise a fluid heater or any machine that requires heated liquid.

In yet another alternate embodiment, the alternate embodiment does not have a steam input pipe, steam output pipe, steam press, boiler, or feed pipe.

Accordingly, a feature and advantage of the present invention is its ability to efficiently maintain a selected volume of heated water.

Another feature and advantage of the present invention is its ability to monitor the system with minimal exposure to the corrosive effects of hot water on the water level monitor's float because the float is in the cold water tank.

Yet another feature and advantage of the present invention is its ability to provide and produce steam.

Still another feature and advantage of the present invention is its ability to produce both heated water and steam.

Yet still another feature and advantage of the present invention is its ability to run continuously without external monitoring.

These and other features and advantages of the present invention will become more apparent to one skilled in the art from the following description and claims when read in light of the accompanying drawings.

BRIEF DESCRIPTION OF THE SEVERAL VIEWS OF THE DRAWINGS

The present invention will be better understood by reading the Detailed Description of the Preferred and Selected Alternate Embodiments with reference to the accompanying drawing figures, which are not necessarily drawn to scale, and in which like reference numerals denote similar structure and refer to like elements throughout, and in which.

DETAILED DESCRIPTION OF THE PREFERRED AND SELECTED ALTERNATE EMBODIMENTS OF THE INVENTION

In describing the preferred and selected alternate embodiments of the present invention, as illustrated in FIGS. 1-4, specific terminology is employed for the sake of clarity. The invention, however, is not intended to be limited to the specific terminology so selected, and it is to be understood that each specific element includes all technical equivalents that operate in a similar manner to accomplish similar functions.

Figure 1:
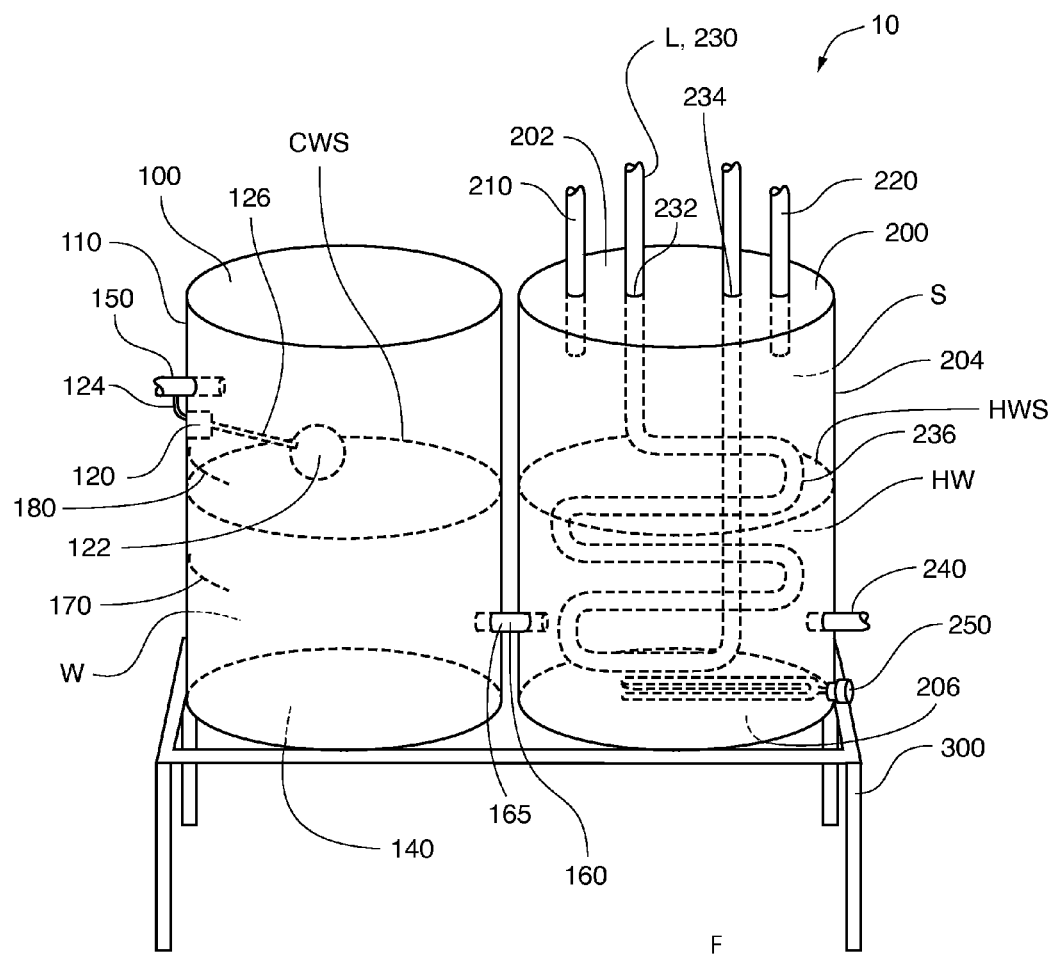
FIG. 1 is a perspective view of a fluid heater according to a preferred embodiment.
Figure 2:
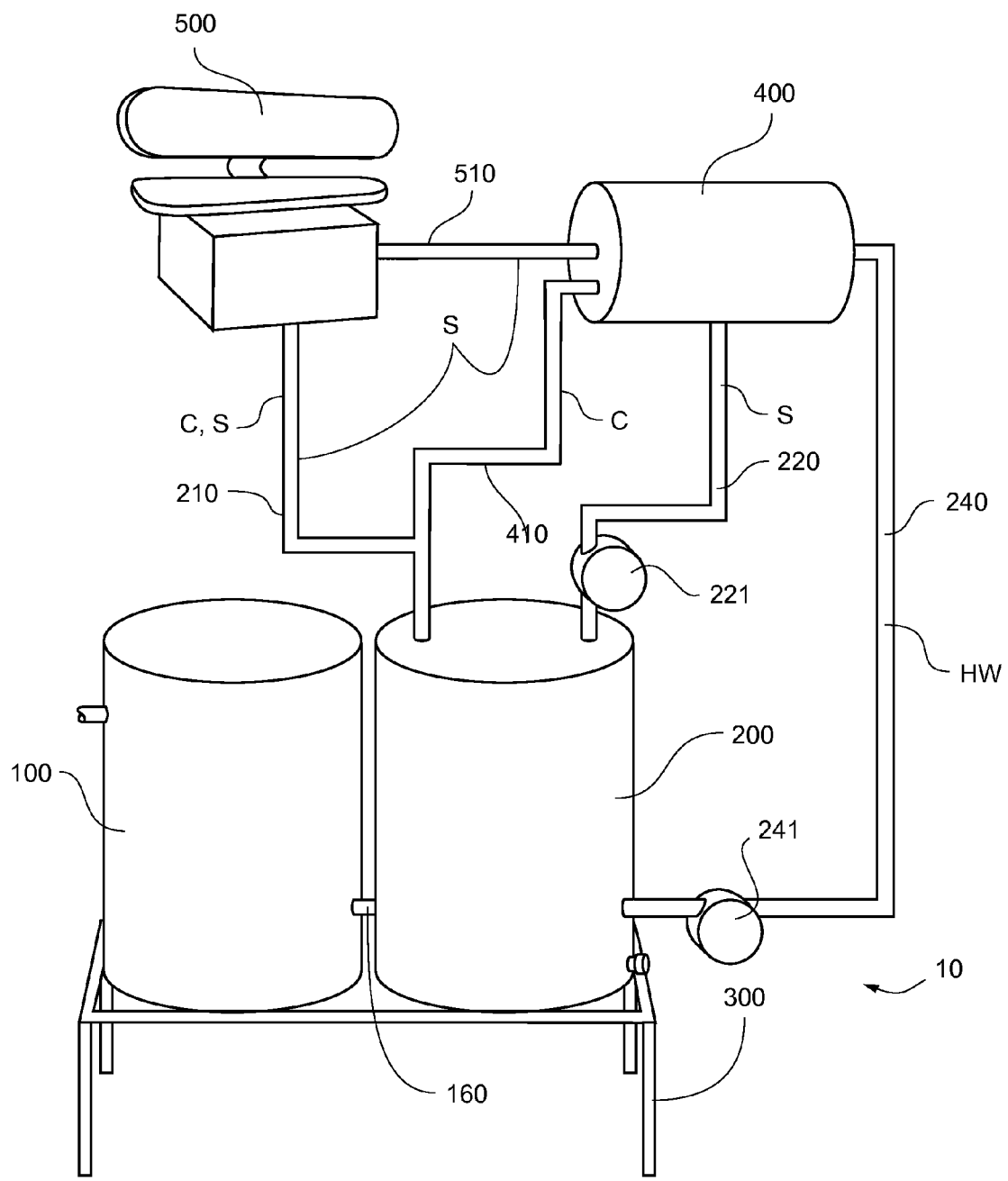
FIG. 2 is a perspective view of a fluid heater according to the preferred embodiment of FIG. 1, shown in use with a steam press and boiler.
Figure 3:
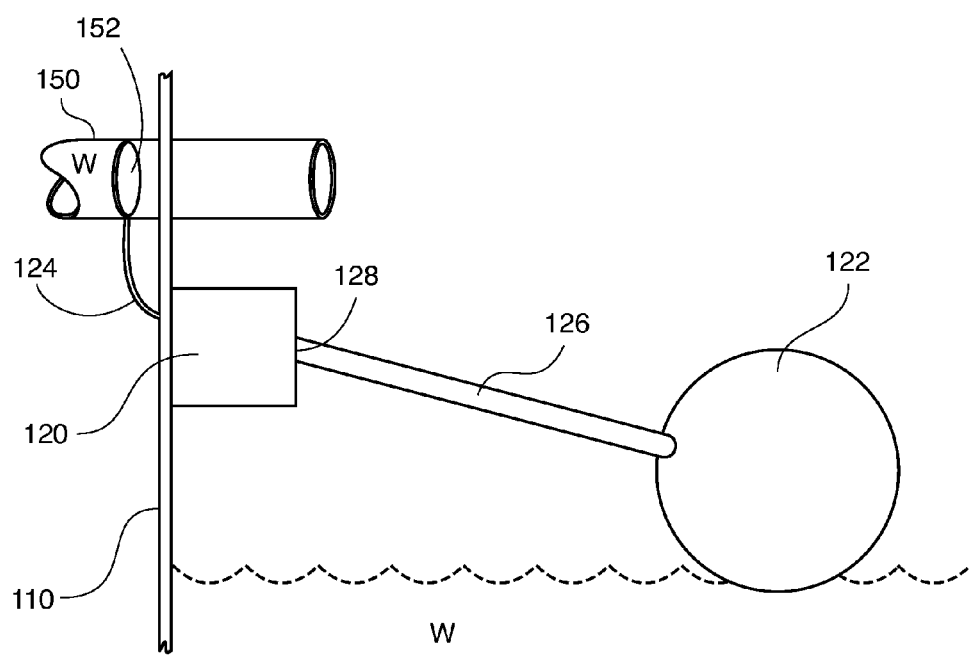
FIG. 3 is a detail perspective view depicting a monitoring device of the preferred embodiment of FIG. 1.

Referring now to FIGS. 1-3, the present invention in a preferred embodiment is fluid heater 10, wherein fluid heater 10 comprises first container 100, second container 200, and stand 300. First container 100 comprises side 110, bottom 140, input pipe 150, intermediary pipe 160, lower refill level 170, maximum refill level 180, and water level monitor 120, wherein water level monitor 120 (best shown in FIG. 3) comprises float 122, wire 124, arm 126, and hinge 128, and input pipe 150 comprises valve 152, and intermediary pipe 160 comprises one-way valve 165. Water level monitor 120 is disposed within wall 110. It will be recognized by those skilled in the art that water level monitor 120 could be disposed outside wall 110. Second container 200 comprises top 202, peripheral wall 204, base 206, steam input pipe 210, steam output pipe 220, hot water output pipe 240 and heating element 250.

First container 100 and second container 200 are preferably disposed on stand 300, wherein stand 300 is preferably disposed on floor F. Water level monitor 120 is fixedly secured to side 110. Water level monitor 120 controls valve 152 via wire 124. Valve 152 is disposed within input pipe 150, wherein valve 152 selectively allows water W into first container 100 via input pipe 150. Arm 126 is hingedly secured to water level monitor 120 via hinge 128, and float 122 is secured to arm 126 (best shown in FIG. 3). Hinge 128 permits arm 126, and thus float 122, to hingedly rotate both closer to and farther from floor F.

First container 100 is in fluid communication with second container 200 via intermediary pipe 160. Intermediary pipe 160 preferably comprises one-way valve 165, wherein one-way valve 165 only permits water W to flow from first container 100 to second container 200.

Turning to second container 200, steam input pipe 210 and steam output pipe 220 are disposed through top 202. Heating element 250 is preferably disposed proximate to base 206. Steam S and hot water HW are disposed within second container 200, wherein hot water surface HWS forms a border between steam S and hot water HW. Steam input pipe 210 and steam output pipe 220 are in fluid communication with steam S, but do not contact hot water HW. Steam S flows into second container 200 via steam input pipe 210, and steam S flows out of second container 200 via steam output pipe 220.

In a typical construct, fluid heater 10 is in fluid communication with boiler 400 and/or dry cleaning machine 500 (best shown in FIG. 2). Dry cleaning machine 500 comprises feed pipe 510 and is in fluid communication with boiler 400 via feed pipe 510, and boiler 400 comprises condensation pipe 410, and boiler 400 is in fluid communication with second container 200 via condensation pipe 410, wherein condensation pipe 410 joins and fluidly communicates with steam inlet pipe 210. Second container 200 is in fluid communication with boiler 400 via steam output pipe 220, wherein steam S is disposed over hot water surface HWS and is available to boiler 400, thereby reducing load on boiler 400, by lessening the amount of hot water HW necessary to be converted to steam S. Steam S is optionally moved from second container 200 to boiler 400 through steam output pipe 220 with flow augmented by steam pump 221. Dry feed cleaning machine 500 is in fluid communication with second container 200 via steam input pipe 210, wherein expended steam S from dry cleaning machine 500 is returned to second container 200.

Second container 200 is in fluid communication with boiler 400 via hot water outlet pipe 240, wherein hot water HW is fed to boiler 400 via hot water outlet pipe 240 as required to provide make up water for boiler 400. Hot water HW is optionally moved from second container 200 to boiler 400 via pump 241.

In use, hot water HW exits second container 200 via hot water output pipe 240 and moves to boiler 400. Boiler 400 heats steam S and hot water HW and sends steam S into feed pipe 510. Any residual condensate C from boiler 400 is collected and passes into condensation pipe 410 back to second container 200. The advantage of sending hot water HW into boiler 400 rather than water W is that boiler 400 needs to use less energy to heat hot water HW into steam S than it would for water W. Further, a similar advantage occurs by sending steam S from above hot water surface HWS to boiler 400.

Dry cleaning machine 500 utilizes steam S to clean clothes. Subsequently, excess steam S and condensate C move from dry cleaning machine 500 to second container 200 via steam input pipe 210. It will be recognized by those skilled in the art that steam S from boiler 400 could be utilized by apparatuses other than dry cleaning machine 500.

Because condensate C and steam S flowing to second container 200 may not fully replenish second container 200, water W also flows to second container 200 from first container 100 via intermediary pipe 160. Because of one-way valve 165, intermediary pipe 160 only allows water W to flow from first container 100 to second container 200, wherein hot water HW in second container 200 naturally seeks the same level as water W in first container 100.

Cold water surface CWS in first container 100 is monitored by float 122, which is buoyed by water W. As water W flows from first container 100 to second container 200 float 122 moves closer to floor F. When float 122 is level with lower refill level 170, water level monitor 120, which is in electrical communication with valve 152 via wire 124, opens valve 152, permitting water W to flow into first container 100. As water flows into first container 100, float 122 moves farther from floor F, reaching maximum refill level 180, wherein water level monitor 120 closes valve 122. After water W exits first container 100 and enters second container 200, heating element 250 heats what was formerly water W into hot water HW. Hot water HW exits second container 200 via hot water output pipe 240.

It will be recognized by those skilled in the art that water level monitor 120 may comprise any mechanism for measuring the disposition of cold water surface CWS relative to lower refill level 170 and maximum refill level 180. It will further be recognized that water level monitor 120 may continuously open valve 152, and thus allow water W to flow into first container 100, so long as cold water surface CWS is below maximum refill point 180.

In an alternate embodiment, fluid heater 10 comprises first container 100 and second container 200, wherein second container 200 lacks steam input pipe 210 and steam output pipe 220, thereby providing only hot water HW via hot water output pipe 240.

Figure 4:
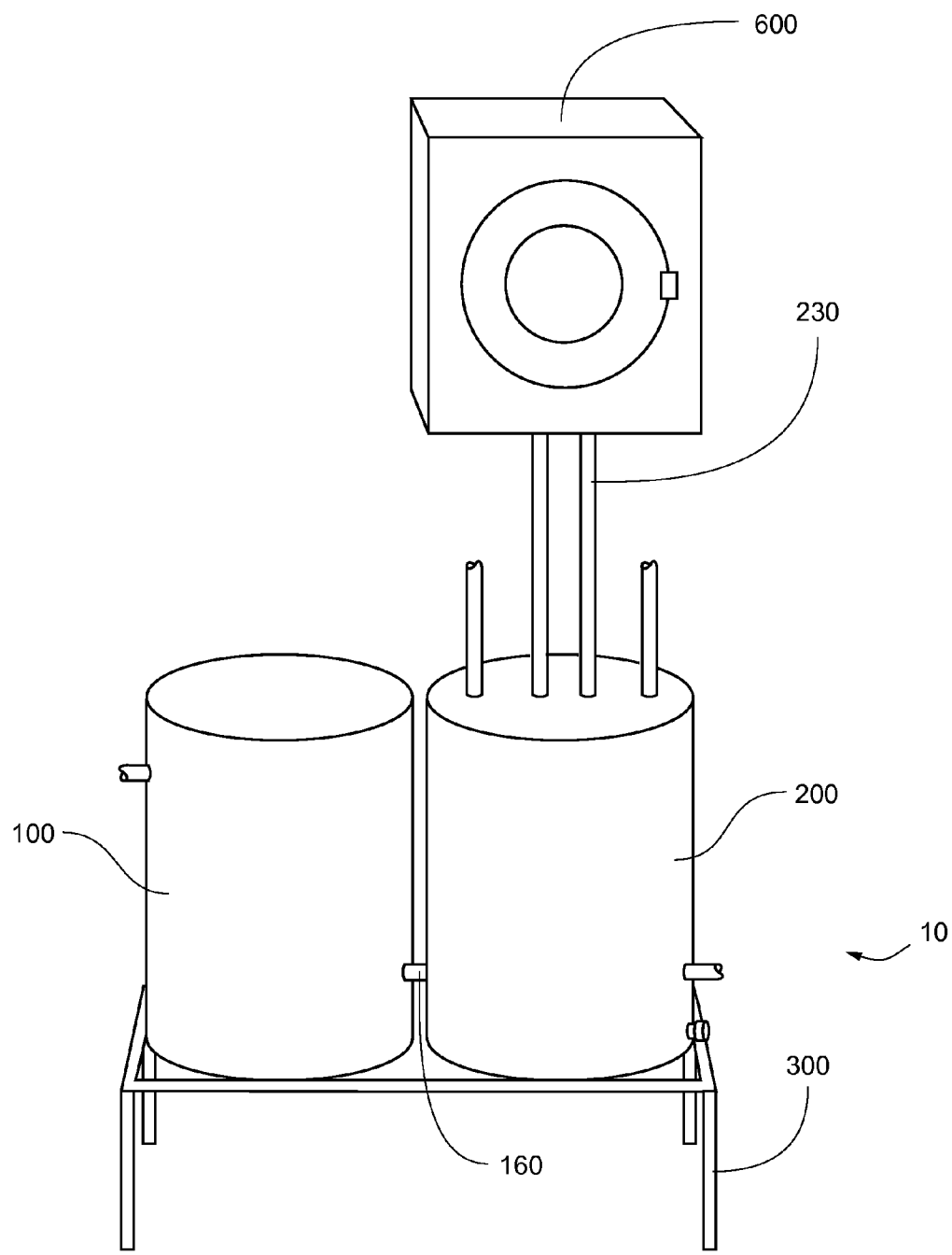
FIG. 4 is a perspective view of a fluid heater according to an alternate embodiment, shown in use with a washing machine.

Referring now more specifically to FIGS. 1 and 4, illustrated therein is an alternate embodiment of fluid heater 10, wherein the alternate embodiment of FIG. 4 is substantially equivalent in form and function to that of the preferred embodiment detailed and illustrated in FIGS. 1-3 except as hereinafter specifically referenced. Specifically, the alternate embodiment of FIGS. 1 and 4, further comprises washing machine 600, and second container 200 further comprises heat exchanger 230, wherein heat exchanger 230 comprises first end 232, second end 234, and coil 236.

Liquid L, disposed within heat exchanger 230, flows from first end 232 to second end 234 via coil 236. The large amount of surface area between coil 236 and hot water HW in second container 200 permits heat to be transferred to liquid L in heat exchanger 230. Thus, liquid L exiting second end 234 is hotter than liquid L entering first end 232.

It will be recognized that liquid L disposed within heat exchanger 230, could be any liquid, including, without limitation, water. It will also be recognized that washing machine 600 could comprise any machine that requires heated liquid to be provided to it.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. A fluid heater comprising:
   a first container, wherein said first container comprises a water level monitor and a water input pipe with a valve, wherein said water level monitor controls said valve;

a second container, wherein said second container is in fluid communication with said first container via an intermediary pipe, and wherein said intermediary pipe comprises a one-way valve that permits flow only from said first container to said second container;

wherein said second container further comprises a water output pipe, wherein water flows through said water output pipe to a boiler, and wherein steam flows from said boiler to a dry cleaning machine.

2. The fluid heater of claim 1, wherein said second container further comprises a heat exchanger having a first end, a coil, and a second end wherein said coil is disposed within a hot water within said second container, and wherein liquid disposed within said heat exchanger is separated from, and prevented from, fluid communication with a hot water in said second container.

3. The fluid heater of claim 1, wherein said second container further comprises a steam input pipe and a steam output pipe in fluid communication with said boiler.

4. The fluid heater of claim 1, wherein steam and condensate enter said second container through said steam input pipe.

5. The fluid heater of claim 1, wherein said water level monitor is in electrical communication with said valve to regulate a water level in said first container.

6. The fluid heater of claim 5, wherein said water level monitor comprises a float, an arm and a hinge.

7. The fluid heater of claim 1, wherein said second container is in fluid communication with a dry cleaning machine via said steam input pipe, and wherein said second container is also in fluid communication with a boiler via said steam input pipe.

8. The fluid heater of claim 7, wherein said steam input pipe and said steam output pipe are disposed above a hot water surface within said second container without contacting said hot water surface.

9. A method of operating a fluid heater, said method comprising the steps of:

moving water from a first container to a second container via an intermediary pipe, wherein the water in said first container comprises a water surface, and wherein said intermediary pipe comprises a one-way valve that permits flow only from said first container to said second container;

monitoring the water surface in said first container via a water level monitor;

opening a valve in an input pipe to allow water into said first container when the water surface is level with a lower refill point, wherein said valve is in electrical communication with said water level monitor, and wherein said water level monitor is disposed within said first container;

moving a liquid from said second container to a boiler via a water output pipe; and generating steam flows from said boiler to a dry cleaning machine.

10. The method of claim 9, said method further comprising the step of:

condensing said steam flows in said second container via a steam input pipe between said dry cleaning machine and said second container.

11. The method of claim 9, said method further comprising the step of:

moving a liquid through a heat exchanger, wherein said heat exchanger comprises a first end, a second end, and a coil, wherein said coil is disposed within said hot water within said second container, and wherein said liquid disposed within said heat exchanger is separated from, and prevented from, fluid communication with said hot water in said second container.

12. An apparatus comprising:

a fluid heater, wherein said fluid heater comprises a first container and a second container, and wherein said first container and said second container are in fluid communication via an intermediary pipe with a one-way valve that permits fluid flow from said first container to said second container and prevents fluid flow from said second container to said first container, and wherein said first container comprises a level monitor, and wherein said level monitor comprises a float;

wherein said second container further comprises a fluid output pipe, and wherein fluid flows through said fluid output pipe to a boiler, and wherein steam flows from said boiler to a dry cleaning press;

wherein said second container further comprises a steam input pipe and a steam output pipe in fluid communication with said boiler;

and wherein said second container further comprises a heat exchanger, and wherein said heat exchanger comprises a first end, a second end and a coil, and wherein said coil is disposed within a hot water therein said second container.

13. The apparatus of claim 12, wherein said heat exchanger provides hot water to a washing machine.

14. The apparatus of claim 12, wherein said steam output pipe supplies steam to a boiler, and wherein said boiler augments said steam and supplies said augmented steam to said dry cleaning press, and wherein said steam input pipe recovers condensate from said boiler and residual steam from said dry cleaning press.

15. The apparatus of claim 14, wherein said second container contains both hot water and said residual steam recovered from said dry cleaning press, and wherein said steam is disposed over said hot water.

16. The apparatus of claim 15, wherein said boiler is supplied with said hot water from said second container.

* * * * *